United States Patent [19]
White et al.

[11] Patent Number: 4,760,118
[45] Date of Patent: Jul. 26, 1988

[54] POLYPHENYLENE ETHER CAPPED WITH SALICYLIC ACID ESTER

[75] Inventors: Dwain M. White, Schenectady; Laura A. Socha, Troy, both of N.Y.

[73] Assignee: General Electric Company, Schenectady, N.Y.

[21] Appl. No.: 28,857

[22] Filed: Mar. 23, 1987

[51] Int. Cl.$^4$ .............................................. C08G 65/48
[52] U.S. Cl. .................................... 525/397; 525/393; 525/394; 528/214
[58] Field of Search ...................... 525/397, 393, 394; 528/198, 199, 214

[56] References Cited

U.S. PATENT DOCUMENTS 3,375,228  3/1968  Holoch et al. ......................... 260/47
4,048,143  9/1977  Hay et al. ............................. 260/47
4,058,504  11/1977  Yonemitsu et al. ................. 528/397

OTHER PUBLICATIONS

Jerussi et al., *J. Polymer Sci.*, Part A-1, 6, 3167-3169 (1968).

*Primary Examiner*—Harold D. Anderson
*Attorney, Agent, or Firm*—William H. Pittman; James C. Davis, Jr.; James Magee, Jr.

[57] ABSTRACT

Polyphenylene ethers are capped by reaction in the melt with an ester of salicylic acid, anthranilic acid or a substituted derivative thereof; esters of salicylic acid, and especially salicylic carbonate and linear polysalicylates, are preferred. The capping reaction typically takes place at a temperature in the range of about 225°-325° C., employing about 5-12% by weight of the ester based on polyphenylene ether.

20 Claims, No Drawings

POLYPHENYLENE ETHER CAPPED WITH SALICYLIC ACID ESTER

This invention relates to polyphenylene ethers, and more particularly to the stabilization thereof by capping.

The polyphenylene ethers are a well known class of polymers, characterized by a unique combination of chemical, physical and electrical properties over a temperature range of more than 350° C., extending from a brittle point of about −170° C. to a heat distortion temperature of about 190° C. This combination of properties renders them suitable for use as engineering thermoplastics in a broad range of applications which are well known in the art and are disclosed in numerous patents and other publications.

The polyphenylene ethers generally comprise a plurality of structural units having the formula

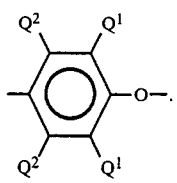
(I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are known. Illustrative homopolymers are those containing 2,6-dimethyl-1,4-phenylene ether units. Illustrative copolymers include random copolymers containing such units in combination with (for example) 2,3,6-trimethyl-1,4-phenylene ether units. Many such random copolymers, as well as homopolymers, are disclosed in the patent literature.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

A first class of operative catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds are also known. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are cobalt-containing catalyst systems. Suitable manganese and cobalt-containing catalyst systems for polyphenylene ether preparation are known in the art by reason of disclosure in numerous patents and publications.

A molecular feature of many polyphenylene ethers is the presence of end groups of at least one of the formulas

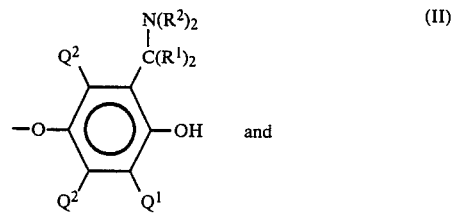
and

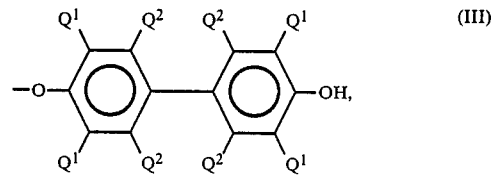

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers with 4-hydroxybiphenyl end groups of formula III are typically obtained from reaction mixtures in which a by-product diphenoquinone of the formula

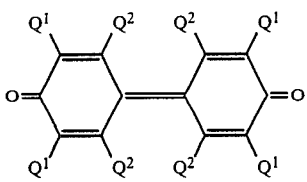

is present, especially in a copper-halide-secondary or tertiary amine system. In this regard, the disclosures of U.S. Pat. Nos. 4,234,706, 4,477,649 and 4,842,697 are pertinent and are incorporated by reference herein. In mixtures of this type, the diphenoquinone is ultimately incorporated into the polymer in substantial proportions, largely as an end group.

Polymers containing the aminoalkyl-substituted end groups of formula II are obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

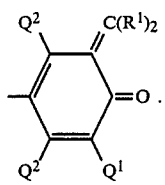

In many polyphenylene ethers obtained under the above-described conditions, a substantial proportion of the polymer molecules, typically constituting as much as about 90% by weight of the polymer, contain end groups having one or frequently both of formulas II and III.

The aminoalkyl end groups of formula II have numerous effects on the chemistry of the polyphenylene ether. Many of these effects are beneficial, often including an increase in impact strength and compatibilization with other blend components. Reference is made to the aforementioned U.S. Pat. No. 4,477,649 as well as U.S. Pat. Nos. 4,054,553, 4,092,294, 4,477,651 and 4,517,341, the disclosures of which are also incorporated by reference herein. Other effects, however, may be detrimental under circumstances such as those described hereinafter.

One disadvantage of polyphenylene ethers is their tendency to become dark colored and brittle when exposed to extreme conditions such as those of high temperature, particularly in the presence of oxygen. It is believed that these phenomena are caused by oxidation of terminal hydroxy groups on the polyphenylene ether chain. Various methods, such as those described in U.S. Pat. Nos. 3,375,228 and 4,048,143, have been developed for inactivating the hydroxy groups by capping; that is, by reaction with an inactivating agent, such as by acylation.

The capping processes heretofore known suffer from various disadvantages. For one thing, they are normally conducted in solution, which requires a dissolution operation and a solvent removal step which may be evaporation or precipitation with a non-solvent. Moreover, solution reactions conducted at relatively low temperatures (i.e., up to about 200° C.) are not entirely effective since subsequent heating of the capped polyphenylene ether during processing results in the production of additional hydroxy groups, identified in the aforementioned U.S. Pat. No. 3,375,228 as "incipient hydroxyl groups". This is believed to be at least in part the result of backbone rearrangement as follows, as illustrated for two structural units in a poly(2,6-dimethyl-1,4-phenylene ether):

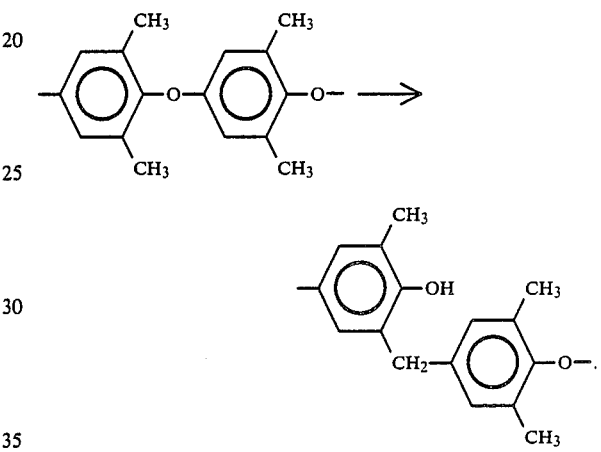

The result is that one is, in a sense, right back where one started: with a hydroxy-terminated polyphenylene ether which is inherently unstable under extreme conditions.

Various methods for capping incipient hydroxyl groups have also been developed, but they ordinarily require treatment with a large excess of the capping reagent under conditions of very high temperature and/or pressure. These are, for the most part, also solution reactions, since despite the suggestion to the contrary in said U.S. Pat. No. 3,375,228, extrusion capping methods have generally not been found satisfactory on a commercial scale.

The foregoing problems are compounded when the polyphenylene ether contains an aminoalkyl end group of formula II. Even when capped, such end groups are particularly susceptible to decomposition at high temperatures with the regeneration of primary or secondary amine and the production of another quinone methide end group, which may in turn generate a 2,6-dialkyl-1-hydroxyphenyl end group. The mechanism of the latter reaction is not known with certainty, but it is believed to involve dehydrogenation of the regenerated amine with addition of the evolved hydrogen to the quinone methide. An additional by-product is the acid corresponding to the capping agent, and many such acids, including acetic acid, are corrosive to extrusion and molding equipment.

The present invention provides a capping method for polyphenylene ethers which may be efficiently conducted in the melt during extrusion or similar operations, and capped products thus prepared. Since it does not require solution conditions and for other reasons, the method is uniquely adaptable to commercial methods for polyphenylene ether production. In addition, it uses modest amounts of reagents and can be employed in such a way as to cap hydroxy groups generated during extrusion. The result is the production of polyphenylene ethers of high stability under many conditions which previously caused degradation.

In one of its aspects, the invention is a method for capping a polyphenylene ether which comprises reacting said polyphenylene ether in the melt with at least one ester of salicylic acid or anthranilic acid or a substituted derivative thereof. Another aspect is compositions prepared by said method.

The method of the invention is applicable to any known polyphenylene ether, including all of those described hereinabove. It is particularly useful with poly(2,6-dimethyl-1,4-phenylene ethers). Suitable polymers generally have a number average molecular weight within the range of about 3,000–40,000 and a weight average molecular weight within the range of about 20,000–80,000, as determined by gel permeation chromatography. Their intrinsic viscosities are most often in the range of about 0.35–0.6 dl./g., as measured in chloroform at 25° C.

For the most part, it is desirable for all hydroxy end groups on the polyphenylene ether to be capped by the method of this invention. However, the invention includes compositions which contain a proportion of uncapped polyphenylene ether; that is, polyphenylene ether containing terminal hydroxy groups.

To produce the capped polyphenylene ethers of this invention, the polyphenylene ether is reacted in the melt with at least one ester of salicylic acid (preferably) or anthranilic acid or a substituted derivative thereof. As used herein, the term "ester of salicylic acid" includes compounds in which the carboxy group, the hydroxy group or both have been esterified.

Other than as defined above, the precise molecular structure of the ester is not critical. Various substituents may be present on the salicylate ring, including, for example, alkyl, aryl, alkoxy, acyl, nitro, carbalkoxy and nitro, although unsubstituted compounds are preferred.

Particularly preferred are salicylic acid esters, including simple esters of the formula

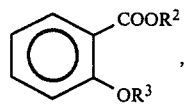

(VI)

wherein each $R^3$ is independently hydrogen or an aliphatic, alicyclic or aromatic radical, preferably a hydrocarbon radical, at least one $R^3$ being other than hydrogen; silyl esters of the formula

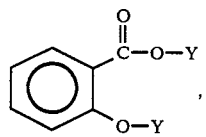

(VII)

wherein each Y is hydrogen or $Si(R^4)_3$, at least one Y being $Si(R^4)_3$, and each $R^4$ is independently a $C_{1-4}$ alkyl radical, all $R^4$ values preferably being methyl; salicylic carbonate(benzo-1,3-dioxin-2,4-dione), having the formula

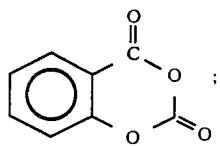

(VIII)

cyclic oligomeric esters (salicylides) of the formula

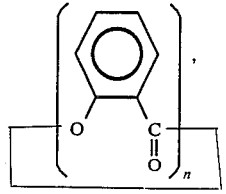

(IX)

wherein n is a small integer and especially 2 or 3; and linear polysalicylates of the formula

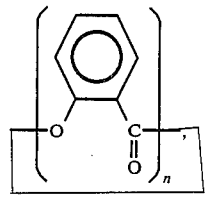

(X)

wherein n is at least 2.

The capping agents which are generally found to give the best yields of the capped polyphenylene ethers of this invention are aryl salicylates such as phenyl salicylate, aspirin (i.e., acetylsalicylic acid), salicylic carbonate and polysalicylates, including both linear polysalicylates and cyclic compounds such as disalicylide and trisalicylide. Such compounds as phenyl salicylate and aspirin react to form acidic by-products (phenol and acetic acid), which may be undesirable. Therefore, the most preferred capping agents are salicylic carbonate and the polysalicylates, especially linear polysalicylates.

Of the capping agents which may be used according to the invention, such compounds as phenyl salicylate, aspirin and isatoic anhydride are commercially available. Salicylic carbonate is a known compound which may be prepared, for example, by the reaction of salicylic acid with phosgene. Disalicylide and trisalicylide are also known, as is their preparation by pyrolysis of aspirin; Baker et al., *J. Chem. Soc.*, 1951, 201.

Linear polysalicylates may be prepared by anionic polymerization of salicylic carbonate; Saegusa et al., *Polym. Bull.*, 1, 341 (1979). They have also been found to be the product (rather than the reported disalicylide) of the treatment of salicylic carbonate with a catalytic amount of triethylamine; Dean et al., *J. Chem. Soc., Perkin I*, 1972, 2007. Linear polysalicylates are additionally obtainable by reacting salicylic acid with acetic anhydride or thionyl chloride, or by pyrolysis of aspirin at somewhat lower temperatures than those employed by Baker et al.; these methods are disclosed and claimed in copending, commonly owned application Ser. No. 151,844, filed Feb. 3, 1988. Finally, the reaction of salicylic acid with phosgene in the presence of a tertiary amine such as triethylamine affords linear polysalicylates in high yield.

According to the invention, the polyphenylene ether is heated in the melt with the capping agent. Typical reaction temperatures are in the range of about 225°-325° C. The capping reaction can be conveniently conducted in an extruder or similar equipment. Under certain circumstances, it may be advantageous to extrude the polyphenylene ether with vacuum venting, thus removing a substantial proportion of any amines present in the catalyst. The capping agent may then be advantageously introduced downstream from the polyphenylene ether feed.

The proportion of capping agent used should, as previously noted, generally be sufficient to react with substantially all hydroxy end groups, including aminoalkyl end groups of formula II, 4-hydroxybiphenyl end groups of formula III and any conventional 2,6-dialkylphenol end groups. The latter include any groups formed in the extruder by decomposition of capped and uncapped aminoalkyl end groups as previously described. In addition, it is generally beneficial to employ enough capping agent to react with any amine generated.

Said proportion will to some extent depend on the molecular weight and level of end groups of formula III in the polymer, as well as other hydroxy-substituted "tail" end groups resulting from equilibration with diphenoquinone. About 3-12%, most often about 5-12% and preferably about 6-10% by weight of capping agent, based on polyphenylene ether, is usually adequate.

It is also within the scope of the invention to include at least one polystyrene in the composition being capped. The term "polystyrene" as used herein includes polymers prepared by methods known in the art including bulk, suspension and emulsion polymerization, which contain at least 25% by weight of structural units derived from a monomer of the formula

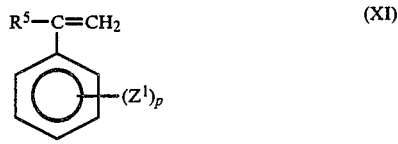

(XI)

wherein $R^5$ is hydrogen, lower alkyl or halogen; $Z^1$ is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98-70% styrene and about 2-30% diene monomer. Polystyrenes are known to be miscible with polyphenylene ethers in all proportions, and any such blend may contain polystyrene in amounts of about 5-95% and most often about 25-75%, based on total resins.

The compositions of this invention have been shown by infrared and carbon-13 nuclear magnetic resonance spectroscopy to contain end groups with salicylate ester moieties. Accordingly, another aspect of the invention is compositions comprising capped polyphenylene ethers which comprise polymer molecules having end groups of at least one of the formulas

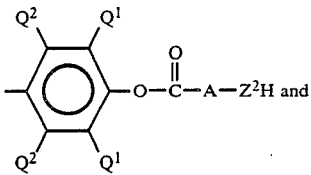

(XII)

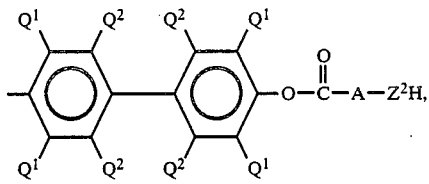

(XIII)

wherein A is an unsubstituted or substituted o-phenylene radical, $Z^2$ is O or NH and $Q^1$ and $Q^2$ are as previously defined. While the invention is not dependent on theory, it is believed that the capping agent is converted, under the conditions employed, to a ketene of the formula

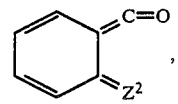

which then reacts with the hydroxy group to form an end group of formula XII or XIII.

The capped polyphenylene ethers of this invention are in many respects superior to uncapped polyphenylene ethers. For example, they are much less susceptible to oxidative degradation at high temperatures. This is demonstrated by a dramatic increase in time to embrittlement upon heat aging in air, and also by a decrease in oxygen uptake under high-temperature conditions. For the most part, tensile properties are not materially affected by capping.

Depending on the capping agent used, the glass transition and heat distortion temperatures of the capped polymers may be lower than those of the corresponding uncapped polyphenylene ethers. For example, linear polysalicylates are found to cause a greater decrease in said temperatures than salicylic carbonate. This phenomenon is apparently the result of various by-products which plasticize the polyphenylene ether. The plasticization effect may be decreased or eliminated by dissolving and reprecipitating the polymer after capping, thus removing the plasticizing materials.

The invention is illustrated by the following examples.

EXAMPLE 1

A series of laboratory-scale experiments with various capping agents was conducted. In each experiment, a solution of the capping agent in pentane was added to a poly(2,6-dimethyl-1,4-phenylene ether) having an intrinsic viscosity in chloroform at 25° C. of about 0.48. The slurry was heated under nitrogen, with stirring, in a molten salt bath maintained at 300° C., until the pentane had been removed by distillation and the temperature of the mixture had risen to 270° C. Heating was then continued for 3 minutes, during which time the temperature rose to about 290° C.

The reaction vessel was removed from the salt bath and the contents were transferred to a beaker and dissolved in hot o-dichlorobenzene. The polymer was precipitated by the addition of methanol, filtered, dried, dissolved in toluene and again precipitated with methanol, washed with additional methanol and dried at 60° C. under vacuum. It was then analyzed by Fourier transform infrared spectroscopy in comparison with two controls: a polyphenylene ether which had been similarly heated in the absence of capping agent and a completely acetyl-capped polyphenylene ether. The results are given in Table I.

TABLE I

| Capping agent | Wt. % | % capping |
| --- | --- | --- |
| Salicylic carbonate | 10 | 97 |
| Salicylic carbonate | 6 | 96 |
| Isatoic anhydride | 10 | 46 |
| Linear polysalicylate | 10 | 99 |
| Linear polysalicylate | 8 | 93 |
| Linear polysalicylate | 6 | 90 |
| Disalicylide | 10 | 100 |
| Disalicylide | 6 | 98 |
| Trisalicylide | 10 | 93 |
| Aspirin | 10 | 100 |
| Phenyl salicylate | 10 | 95 |
| Trimethylsilyl trimethylsilylsalicylate | 10 | 83 |

EXAMPLE 2

The procedure of Example 1 was repeated, substituting a commercially available styrene homopolymer for 50% by weight of the polyphenylene ether and using linear polysalicylate as the capping agent. The results are given in Table II, with the proportion of capping agent being expressed as a percentage of polyphenylene ether.

TABLE II

| Wt. % capping agent | % capping |
| --- | --- |
| 4 | 71 |
| 6 | 81 |
| 8 | 100 |

EXAMPLE 3

Samples of the polyphenylene ether of Example 1 were dry blended with 6%, 7% and 10% linear polysalicylate and extruded at 282°–327° C. on a single-screw extruder. The extrudates were analyzed as in Example 1 and were found to be capped to the extent of 94%, 99% and 100%, respectively.

EXAMPLE 4

The polyphenylene ether of Example 1 was combined with a capping agent and extruded in a twin-screw extruder under conventional conditions, with full vacuum venting. Tests of various physical and chemical properties were performed on the capped materials, in comparison with a control in which an uncapped polyphenylene ether was extruded under similar conditions. The various parameters and test results are given in Table II.

TABLE II

| Capping agent[1] Identity | Control | Sal C | Polysal | Polysal | Polysal | Polysal | Polysal |
| --- | --- | --- | --- | --- | --- | --- | --- |
| Amt., % of polymer | — | 6 | 2 | 4 | 6 | 7 | 7 |
| Addn. mode[2] | | S | M | M | M | M | H |
| % capping | — | 81 | 23 | 86 | 99 | 99+ | 99+ |
| Time to embrittlement, wks.[3] | 1 (max.) | — | — | — | 12–13 | — | — |
| Oxygen uptake (in air, 115° C.)[4] | — | — | — | — | 10 | — | 10 |
| Tg, °C. | | | | | | | |
| Initial | 218 | 211 | — | — | 199 | — | — |
| After dissolution & reprecipitation | 216 | 217 | — | — | 218 | — | — |
| Heat distortion temp., °C. | 187 | 189 | 188 | 180 | 177 | 173 | — |
| Tensile strength, MPa. | | | | | | | |
| At break | 60.0 | — | 60.7 | 62.1 | 64.1 | 71.7 | 63.4 |
| At yield | 76.5 | — | 76.5 | 79.3 | 79.3 | 79.3 | 78.6 |

[1]"Sal C"—salicylic carbonate; "Polysal"—linear polysalicylate.
[2]"M"—molten capping agent added downstream; "S"—solid capping agent added downstream; "H"—capping agent originally dry blended with polymer.
[3]Upon air aging at 115° C., as shown in 3-point bend test.
[4]As % of control value.

What is claimed is:

1. A method for capping a polyphenylene ether which comprises reacting said polyphenylene ether in the melt with at least one ester of salicylic acid or a substituted derivative thereof.

2. A method according to claim 1 wherein the polyphenylene ether comprises a plurality of structural units having the formula

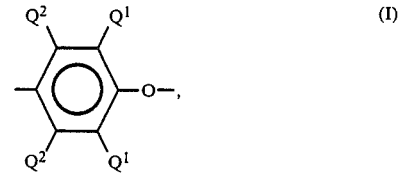

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A method according to claim 2 wherein about 3–12% by weight of said ester is employed, based on polyphenylene ether.

4. A method according to claim 3 wherein each $Q^1$ is methyl, each $Q^2$ is hydrogen and the reaction is effected at a temperature in the range of about 225°–325° C.

5. A method according to claim 4 wherein the ester is an ester of salicylic acid and about 6–10% thereof is employed, based on polyphenylene ether.

6. A method according to claim 5 wherein the polyphenylene ether contains end groups having at least one of the formulas

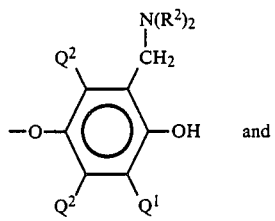

and

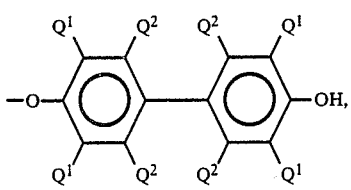
(III)

wherein each $R^2$ is methyl or n-butyl.

7. A method according to claim 5 wherein there is also present at least one polystyrene.

8. A method according to claim 5 wherein the ester has the formula

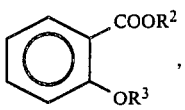
(VI)

wherein each $R^3$ is independently hydrogen or an aliphatic, alicyclic or aromatic hydrocarbon radical, at least one $R^3$ being other than hydrogen.

9. A method according to claim 8 wherein the ester is phenyl salicylate.

10. A method according to claim 8 wherein the ester is acetylsalicylic acid.

11. A method according to claim 5 wherein the ester has the formula

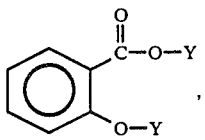
(VII)

wherein each Y is hydrogen or $Si(R^4)_3$, at least one Y being $Si(R^4)_3$, and each $R^4$ is independently a $C_{1-4}$ alkyl radical.

12. A method according to claim 5 wherein the ester has the formula

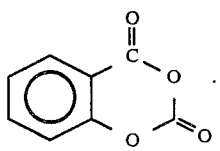
(VIII)

13. A method according to claim 5 wherein the ester has the formula

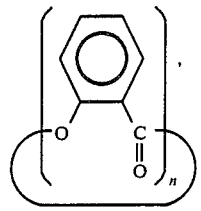
(IX)

wherein n is 2 or 3.

14. A method according to claim 5 wherein the ester is a linear polysalicylate of the formula

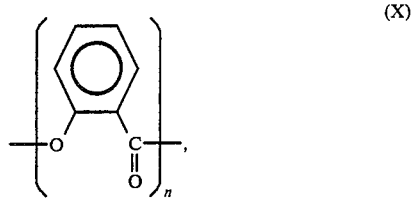
(X)

wherein n is at least 2.

15. A capped polyphenylene ether prepared by the method of claim 1.

16. A capped polyphenylene ether prepared by the method of claim 6.

17. A capped polyphenylene ether composition which comprises polymer molecules having end groups of at least one of the formulas

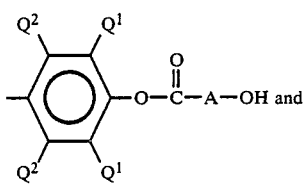
(XII)

and

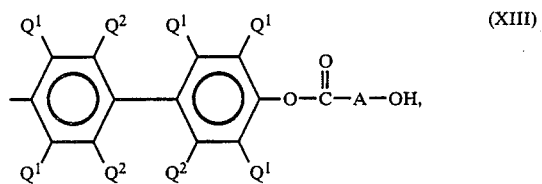
(XIII)

wherein A is an unsubstituted or substituted o-phenylene radical; each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

18. A composition according to claim 17 wherein the polyphenylene ether comprises a plurality of structural units having the formula

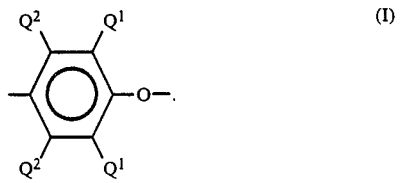
(I)

19. A composition according to claim 18 wherein each $Q^1$ is methyl and each $Q^2$ is hydrogen.

20. A composition according to claim 19 wherein A is unsubstituted.

* * * * *